(12) United States Patent
Suzuki et al.

(10) Patent No.: US 12,110,923 B2
(45) Date of Patent: Oct. 8, 2024

(54) SLIDING COMPONENT

(71) Applicant: EAGLE INDUSTRY CO., LTD., Tokyo (JP)

(72) Inventors: Hiroshi Suzuki, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 44 days.

(21) Appl. No.: 17/783,256

(22) PCT Filed: Dec. 16, 2020

(86) PCT No.: PCT/JP2020/046867
§ 371 (c)(1),
(2) Date: Jun. 7, 2022

(87) PCT Pub. No.: WO2021/125199
PCT Pub. Date: Jun. 24, 2021

(65) Prior Publication Data
US 2023/0012695 A1 Jan. 19, 2023

(30) Foreign Application Priority Data
Dec. 17, 2019 (JP) ................. 2019-227364

(51) Int. Cl.
*F16J 15/34* (2006.01)
*F04C 29/00* (2006.01)
*F16C 33/12* (2006.01)

(52) U.S. Cl.
CPC .......... *F16C 33/12* (2013.01); *F04C 29/0021* (2013.01); *F16J 15/342* (2013.01)

(58) Field of Classification Search
CPC .... F16J 15/3412; F16J 15/3416; F16J 15/342; F04C 29/0021; F16C 33/12
See application file for complete search history.

(56) References Cited

U.S. PATENT DOCUMENTS

| | | | |
|---|---|---|---|
| 3,695,789 A * | 10/1972 | Jansson | F01C 21/003 418/133 |
| 3,945,776 A | 3/1976 | Morita | 418/142 |
| 4,407,512 A | 10/1983 | Trytek | 277/96.1 |
| 4,637,786 A | 1/1987 | Matoba et al. | 418/55 |

(Continued)

FOREIGN PATENT DOCUMENTS

| | | | |
|---|---|---|---|
| CN | 104685213 | 6/2015 | ............. F04C 18/02 |
| DE | 3940258 | 10/1989 | ............... F16J 15/34 |

(Continued)

OTHER PUBLICATIONS

English translation of JP 3399380 by PE2E Apr. 8, 2024.*
(Continued)

*Primary Examiner* — Deming Wan
(74) *Attorney, Agent, or Firm* — HAYES SOLOWAY P.C.

(57) ABSTRACT

Provided is a sliding component capable of reducing the frictional resistance of a sliding surface entailing eccentric rotation. An annular sliding component has a sliding surface relatively sliding with eccentric rotation. A plurality of grooves open to a fluid space on the inner diameter side are circumferentially provided in the sliding surface. A side wall surface of the groove is configured by a wall surface continuous in a circular arc shape in a plan view.

12 Claims, 10 Drawing Sheets

(56) References Cited

U.S. PATENT DOCUMENTS

| | | | |
|---|---|---|---|
| 4,734,020 A | 3/1988 | Inaba et al. | 418/55 |
| 4,824,344 A | 4/1989 | Kimura et al. | 418/55 |
| 6,190,148 B1 | 2/2001 | Ni | 418/55.6 |
| 9,759,216 B2 | 9/2017 | Kato | F04C 29/028 |
| 2002/0021976 A1 | 2/2002 | Riegger et al. | F01C 1/04 |
| 2015/0316093 A1 | 11/2015 | Su | F16C 17/04 |
| 2017/0146014 A1 | 5/2017 | Ohta et al. | F04C 29/0021 |
| 2019/0169988 A1 | 6/2019 | Tokunaga et al. | F01C 19/12 |
| 2020/0063560 A1 | 2/2020 | Tokunaga et al. | F01C 19/08 |
| 2020/0332901 A1 | 10/2020 | Imura | F16J 15/3412 |

FOREIGN PATENT DOCUMENTS

| | | | | |
|---|---|---|---|---|
| EP | 2740974 | | 6/2014 | F16J 15/34 |
| JP | S52-36566 | | 9/1977 | F02B 55/02 |
| JP | S61-8402 | | 1/1986 | F01C 1/02 |
| JP | 2-16381 | | 1/1990 | F04C 18/02 |
| JP | H4-632289 | | 12/1992 | F04C 18/02 |
| JP | H05141370 | | 6/1993 | F04C 18/02 |
| JP | H8-210285 | | 8/1996 | F04C 29/02 |
| JP | H9-88852 | | 3/1997 | F04C 18/356 |
| JP | 2002-39287 | | 2/2002 | F16H 1/32 |
| JP | 2002242858 | | 8/2002 | F04C 18/02 |
| JP | 3399380 B2 | * | 4/2003 | F01C 17/06 |
| JP | 2006-316677 | | 11/2006 | F04C 18/02 |
| JP | 2007182775 A | * | 7/2007 | F04C 18/0276 |
| JP | 2007211702 | | 8/2007 | F04C 18/02 |
| JP | 2010159664 | | 7/2010 | F04C 18/02 |
| JP | 2013-72371 | | 4/2013 | F04C 15/00 |
| JP | 2016-61208 | | 4/2016 | F04C 18/02 |
| JP | WO 2018/025629 | | 2/2018 | F02B 55/02 |
| JP | WO 2018/097064 | | 5/2018 | F01C 19/08 |
| JP | 2018128014 | | 8/2018 | F04C 18/02 |
| JP | WO 2019/139107 | | 7/2019 | F16J 15/34 |
| JP | 2019-196708 | | 11/2019 | F04C 18/02 |

OTHER PUBLICATIONS

English translation of JP 2007182775 by PE2E Apr. 8, 2024.*
International Preliminary Report on Patentability issued in PCT/JP2020/046867, dated May 17, 2022, 5 pages.
International Search Report and Written Opinion issued in PCT/JP2020/046867, dated Feb. 22, 2021, with English translation, 13 pages.
International Preliminary Report on Patentability issued in PCT/JP2020/046868, dated May 17, 2022, 5 pages.
International Search Report and Written Opinion issued in PCT/JP2020/046868, dated Mar. 2, 2021, with English translation, 11 pages.
International Preliminary Report on Patentability issued in PCT/JP2020/046869, dated May 17, 2022, 5 pages.
International Search Report and Written Opinion issued in PCT/JP2020/046869, dated Feb. 22, 2021, with English translation, 15 pages.
U.S. Appl. No. 17/784,599, filed Jun. 10, 2022, Suzuki et al.
U.S. Appl. No. 17/784,604, filed Jun. 10, 2022, Suzuki et al.
European Official Action issued in related Application Serial No. 20903690.4, dated Jan. 8, 2024, 9 pages.
European Official Action issued in related Application Serial No. 20903005.5, dated Nov. 15, 2023, 7 pages.
European Official Action issued in related Application Serial No. 20900996.8, dated Nov. 15, 2023, 7 pages.
Korean Official Action issued in related Application Serial No. 10-2022-7021205, dated Feb. 16, 2024 with translation, 10 pages.
Korean Official Action issued in related Application Serial No. 10-2022-7021620, dated Feb. 16, 2024 with translation, 10 pages.
Korean Official Action issued in related Application Serial No. 10-2022-7020767, dated Feb. 16, 2024 with translation, 10 pages.
Official Action issued in related U.S. Appl. No. 17/784,604, dated Feb. 5, 2024, 10 pages.
Japanese Official Action issued in related Application Serial No. 2021-565605, dated Jul. 23, 2024, 8 pages with translation.
Chinese Official Action issued in related Application Serial No. 202080086835.7, dated Aug. 13, 2024, 10 pages, with translation.

* cited by examiner

SLIDING COMPONENT

TECHNICAL FIELD

The present invention relates to a sliding component used in a rotating machine including an eccentric mechanism.

BACKGROUND ART

In the related art, a scroll compressor used in an automotive air conditioning system as an example of a rotating machine including an eccentric mechanism is provided with a scroll compression mechanism including a fixed scroll provided with a spiral lap on the surface of an end plate and a movable scroll provided with a spiral lap on the surface of an end plate, an eccentric mechanism eccentrically rotating a rotary shaft, and so on. In this mechanism, the movable scroll is slid relative to the fixed scroll with eccentric rotation by the rotation of the rotary shaft. As a result, the refrigerant supplied from a low-pressure chamber on the outer diameter side of both scrolls is pressurized and the high-pressure refrigerant is discharged from the discharge hole formed in the middle of the fixed scroll (see Patent Citation 1).

In addition, the scroll compressor illustrated in Patent Citation 1 is provided with a back pressure supply mechanism supplying a part of the refrigerant compressed by the scroll compression mechanism to a back pressure chamber formed on the back surface side of a thrust plate receiving the axial load of the movable scroll. The movable scroll is pressed toward the fixed scroll by the back pressure acting on the back surface of the movable scroll. As a result, the axial refrigerant leakage between the two scrolls is reduced and the compression efficiency of the scroll compressor is enhanced.

CITATION LIST

Patent Literature

Patent Citation 1: JP 2016-61208 A (Pages 5 to 6, FIG. 1)

SUMMARY OF INVENTION

Technical Problem

In the scroll compressor illustrated in Patent Citation 1, a seal ring is interposed between the thrust plate and a housing. As a result, the thrust plate can be axially moved while the back pressure is prevented from leaking out of the back pressure chamber. As a result, the movable scroll can be pressed toward the fixed scroll via the thrust plate. However, the sliding surface of the thrust plate is pressed against the back surface of the movable scroll, and thus the frictional resistance of the sliding surface is large and the operation of the movable scroll may be affected.

The present invention has been made in view of such a problem, and an object of the present invention is to provide a sliding component capable of reducing the frictional resistance of a sliding surface entailing eccentric rotation.

Solution to Problem

In order to solve the above problem, in a sliding component according to the present invention a sliding component formed in an annular shape and having a sliding surface relatively sliding with eccentric rotation, wherein the sliding surface is provided with a plurality of grooves each of which is open to a fluid space on at least one of an inner diameter side and an outer diameter side of the sliding component and which are arranged in a circumferential direction, and a side wall surface of each of the grooves is configured by a wall surface continuous in a circular arc shape in a plan view. According to the aforesaid feature of the present invention, a fluid is capable of flowing in between sliding surfaces from the opening of the groove provided in the sliding surface relatively sliding with the eccentric rotation, dynamic pressure can be generated along the side wall surface constituting the groove in accordance with the direction of the relative movement of the groove entailed by the eccentric rotation, and the sliding component moves with the dynamic pressure generated in a different aspect in each groove. Accordingly, the lubricity between the sliding surfaces can be improved and the frictional resistance of the sliding surface can be reduced by the sliding surfaces being slightly separated from each other while the vibration, inclination, or the like of the sliding component attributable to dynamic pressure is suppressed and a fluid film being formed. Accordingly, dynamic pressure can be generated at all times in the groove positioned in the range continuous in the circumferential direction of the sliding surface.

It may be preferable that each of the grooves is formed in a semicircular shape having a center at an innermost or outermost diameter of the sliding surface in the plan view. According to this preferable configuration, a stable dynamic pressure can be generated in any direction of relative movement corresponding to the substantially semicircular arc-shaped wall surface of the groove. Accordingly, dynamic pressure can be generated at all times in the groove positioned in the range of approximately 180 degrees in the circumferential direction of the sliding surface.

It may be preferable that each of the grooves is open to the fluid space on the inner diameter side. According to this preferable configuration, the fluid flowing into the groove from the opening of the groove is easily held in the groove by the centrifugal force.

It may be preferable that each of the grooves is open to the fluid space on a high-pressure side. According to this preferable configuration, a fluid easily flows into the groove from the opening of the groove using the pressure of the fluid, and thus a higher dynamic pressure can be generated.

It may be preferable that the sliding component is be one of a pair of relatively sliding components having a radial width smaller than a radial width of remaining one of the relatively sliding components. According to this preferable configuration, dynamic pressure can be reliably generated by the groove between the sliding surfaces sliding relative to each other with eccentric rotation.

BRIEF DESCRIPTION OF DRAWINGS

FIGS. 3B to 3D illustrate the positional relationships between the relatively sliding surfaces of the side seal and the thrust plate at an eccentric rotary shaft rotation of 90, 180, and 270 degrees, respectively. More particularly an eccentric sliding assembly in accordance with the present invention comprises: a first sliding component formed in an annular shape and having a sliding surface, wherein a second sliding component having a sliding surface; and an eccentric driving device configured to cause the sliding surface of the first slide component to slide relative to the sliding surface of the second sliding surface such that a center of the first sliding component imaginarily draws a circle which is eccentric with respect to a center of the second sliding component while keeping non-rotation state of the first sliding component with respect to the center of the first sliding component in a plan view.

DESCRIPTION OF EMBODIMENTS

A mode for implementing the sliding component according to the present invention will be described below based on an embodiment.

Embodiment

The sliding component according to the embodiment of the present invention will be described with reference to FIGS. 1 to 7. In the drawings, the groove formed in the sliding surface of the sliding component or the like is dotted for convenience of description.

The sliding component according to the embodiment of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

Figure 1:
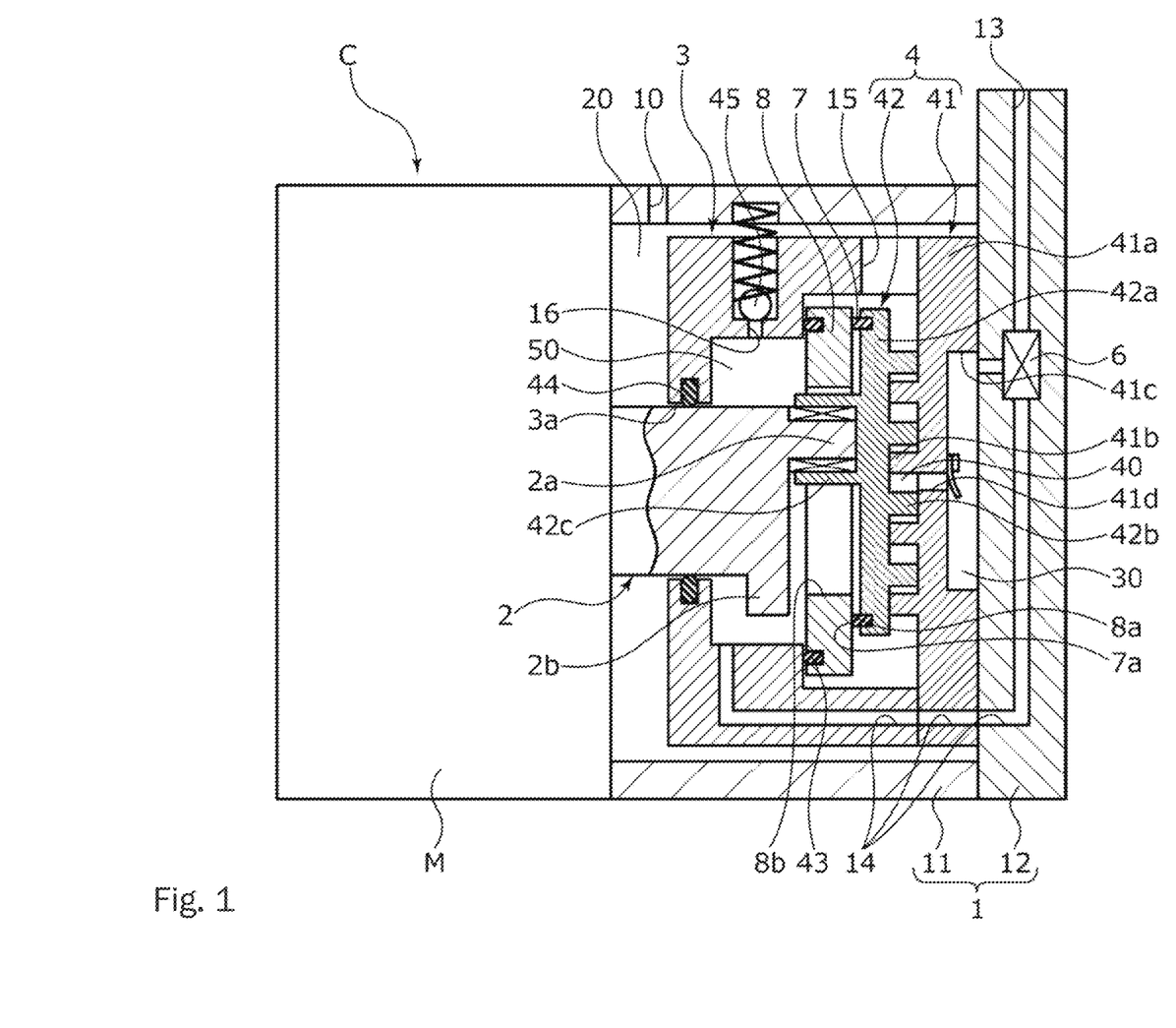
FIG. 1 is a schematic configuration diagram illustrating a scroll compressor to which a side seal as a sliding component according to an embodiment of the present invention is applied.

First, the scroll compressor C will be described. As illustrated in FIG. 1, the scroll compressor C mainly includes a housing 1, a rotary shaft 2, an inner casing 3, a scroll compression mechanism 4, a side seal 7 as a sliding component, a thrust plate 8, and a drive motor M.

The housing 1 includes a cylindrical casing 11 and a cover 12 blocking one opening of the casing 11. Formed in the casing 11 are a low-pressure chamber 20 where a low-pressure refrigerant is supplied through a suction port 10 from a refrigerant circuit (not illustrated), a high-pressure chamber 30 where a high-pressure refrigerant compressed by the scroll compression mechanism 4 is discharged, and a back pressure chamber 50 where a part of the refrigerant compressed by the scroll compression mechanism 4 is supplied together with lubricating oil. It should be noted that the back pressure chamber 50 is formed in the cylindrical inner casing 3 accommodated in the casing 11.

Formed in the cover 12 is a discharge communication passage 13 for communication between the refrigerant circuit (not illustrated) and the high-pressure chamber 30. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with one end of the inner casing 3 abutting against an end plate 41a of a fixed scroll 41 constituting the scroll compression mechanism 4. In addition, in one end portion of the inner casing 3, a suction communication passage 15 penetrating it in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 fixed to the cover 12 in a substantially sealed shape and a movable scroll 42 accommodated in the inner casing 3.

The fixed scroll 41 is made of metal and includes a spiral lap 41b projecting from the surface of the disk-shaped end plate 41a, that is, one end surface of the end plate 41a. In addition, a recessed portion 41c recessed on the inner diameter side of the back surface of the end plate 41a, that is, the other end surface of the end plate 41a is formed in the fixed scroll 41 and the high-pressure chamber 30 is defined from the recessed portion 41c and the end surface of the cover 12.

The movable scroll 42 is made of metal and includes a spiral lap 42b projecting from the surface of a disk-shaped end plate 42a, that is, one end surface of the end plate 42a. In addition, a boss 42c protruding from the middle of the back surface of the end plate 42a, that is, the other end surface of the end plate 42a is formed on the movable scroll 42. An eccentric portion 2a formed in one end portion of the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from one end portion of the rotary shaft 2 in the present embodiment.

When the rotary shaft 2 is rotationally driven by the drive motor M, the eccentric portion 2a rotates eccentrically and the movable scroll 42 slides relative to the fixed scroll 41 with the eccentric rotation. At this time, the movable scroll 42 rotates eccentrically with respect to the fixed scroll 41.

With this rotation, the contact positions of the laps 41b and 42b sequentially move in the rotation direction and a compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Figure 2:
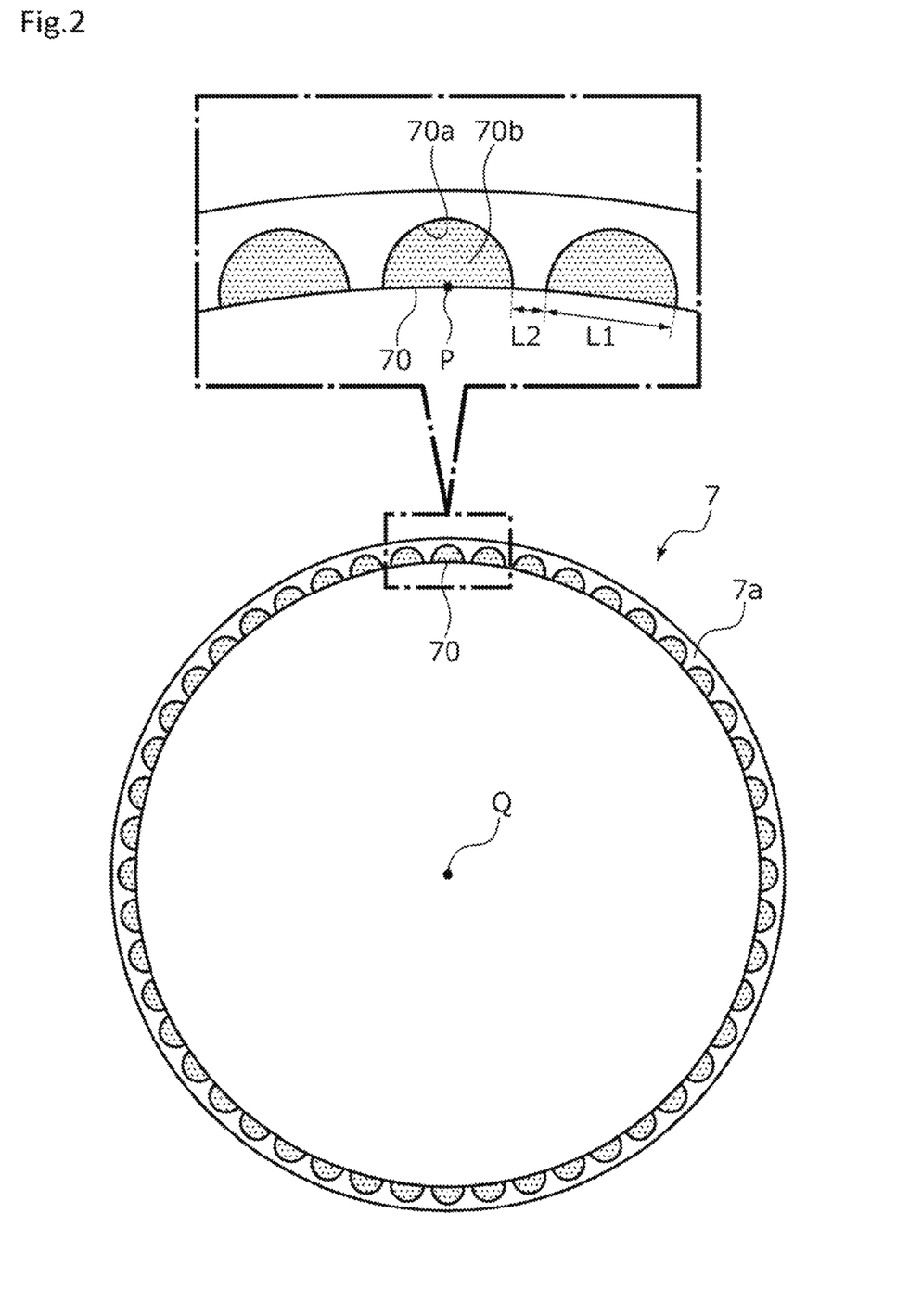
FIG. 2 is a diagram illustrating a sliding surface of the side seal in the embodiment of the present invention.

Next, the side seal 7 as a sliding component in the present embodiment will be described. As illustrated in FIGS. 1 and 2, the side seal 7 is made of resin, has a rectangular cross section and an annular shape in the axial direction, and is fixed to the back surface of the end plate 42a of the movable scroll 42. A sliding surface 7a abutting against a sliding surface 8a of the thrust plate 8 is formed on one side surface of the side seal 7.

As illustrated in FIG. 2, in the sliding surface 7a of the side seal 7, a plurality of grooves 70 open to the space on the inner diameter side, that is, the back pressure chamber 50 are equally arranged in the circumferential direction.

The groove 70 is formed in a substantially semicircular shape having a center P at the innermost diameter of the sliding surface 7a. Specifically, the groove 70 extends in the axial direction so as to be orthogonal to the flat sliding surface 7a, has the same radius of curvature, and includes a continuous and substantially semicircular arc-shaped wall surface 70a and a planar bottom surface 70b extending in parallel to the sliding surface 7a.

It should be noted that the bottom surface 70b of the groove 70 is not limited to the planar bottom surface extending in parallel to the sliding surface 7a and may be formed as, for example, an inclined surface or a curved surface.

In addition, a circumferential dimension L1 of the groove 70 is longer than a circumferential dimension L2 of the land part between the adjacent grooves 70 (i.e., L1>L2). In other words, the plurality of grooves 70 are densely formed over the circumferential direction of the sliding surface 7a and the opening area of the groove 70 into which the fluid flows from the space on the inner diameter side of the sliding surface 7a is large.

In addition, the wall surface 70a of the groove 70 extends to a position on the outer diameter side as compared with the middle of the sliding surface 7a in the radial direction. As a result, the groove 70 has a large fluid holding capacity.

As illustrated in FIG. 1, the thrust plate 8 is made of metal and has an annular shape, a seal ring 43 is fixed to one end surface of the thrust plate 8, and the seal ring 43 abuts against the inner peripheral surface of the inner casing 3. As a result, the thrust plate 8 functions as a thrust bearing that receives the axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is formed as a closed space by sealing between the back pressure chamber 50 and the rotary shaft 2 inserted through a through hole 3a by a seal ring 44, which is fixed to the inner periphery of the through hole 3a provided in the middle of the other end of the inner casing 3. In addition, the back pressure communication passage 14 formed over the cover 12, the fixed scroll 41, and the inner casing 3 and allowing the high-pressure chamber 30 and the back pressure chamber 50 to communicate with each other is provided with an orifice (not illustrated) and the refrigerant in the high-pressure chamber 30 is supplied, after pressure-decreasing adjustment by the orifice, to the back pressure chamber 50 together with the lubricating oil separated by the oil separator 6. At this time, the pressure in the back pressure chamber 50 is adjusted so as to become higher than the pressure in the low-pressure chamber 20. It should be noted that a pressure release hole 16 penetrating the inner casing 3 in the radial direction and allowing the low-pressure chamber 20 and the back pressure chamber 50 to communicate with each other is formed in the inner casing 3 and a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b has the size of a diameter that allows eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentric rotation by the eccentric rotation of the rotary shaft 2 such that a center of the side seal 7 imaginarily draws a circle which is eccentric with respect to a center of the thrust plate 8 while keeping non-rotation state of the side seal 7 with respect to the center of the side seal 7 in a plan view (see FIG. 3).

Figure 3:
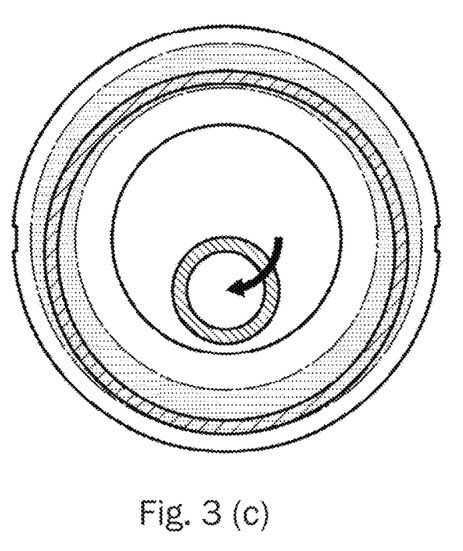
FIG. 3 is a diagram illustrating relative sliding between the sliding surface of the side seal and a sliding surface of a thrust plate in the embodiment of the present invention. It should be noted that FIG. 3A illustrates the start position of the relative sliding
Figure 3A:
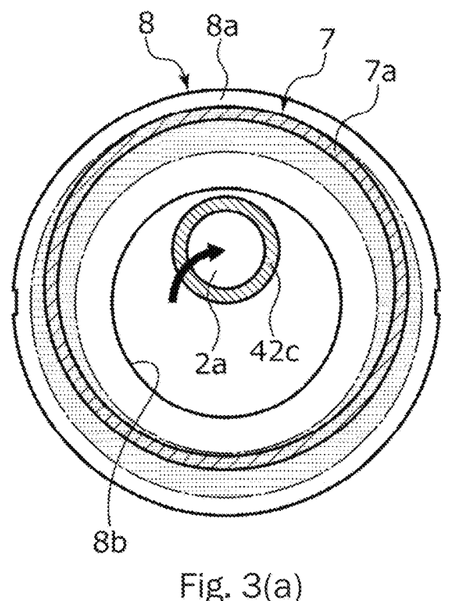
Figure 3B:
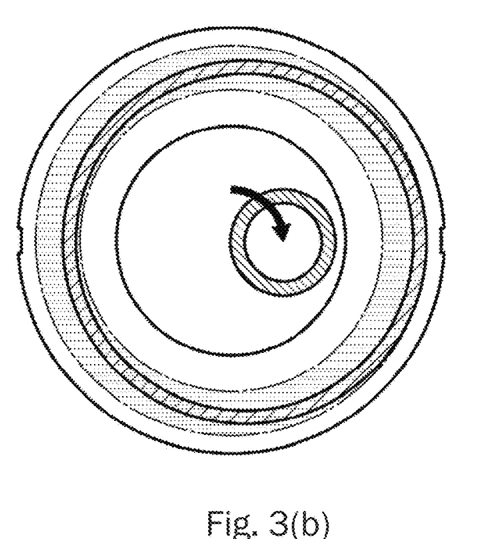
Figure 3D:
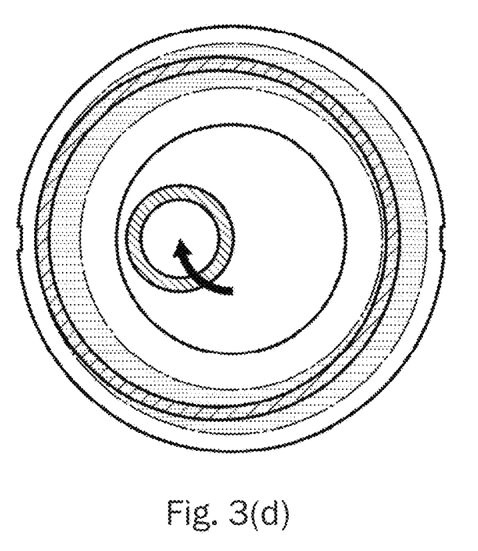

It should be noted that FIGS. 3A to 3D in FIG. 3 illustrate the rotational trajectory of the boss 42c that is viewed from the fixed scroll 41 (see FIG. 1) side. Respectively illustrated in FIGS. 3B to 3D are the boss 42c rotated by 90 degrees, 180 degrees, and 270 degrees with FIG. 3A serving as the clockwise reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the side seal 7 is a sliding component having the sliding surface 7a sliding relative to the sliding surface 8a of the thrust plate 8 with the eccentric rotation.

Next, dynamic pressure generation over the entire side seal 7 during the sliding of the side seal 7 relative to the thrust plate 8 will be described with reference to FIGS. 4 to 7. It should be noted that a fluid containing, for example, a refrigerant and lubricating oil is stored in the groove 70 even when the rotation is stopped. In addition, the side seal 7 that is viewed from the drive motor M (see FIG. 1) side is illustrated in each of FIGS. 4 to 7 and the circle mark on the wall surface 70a of the groove 70 indicates the point where the pressure is highest in each groove 70.

Figure 4:
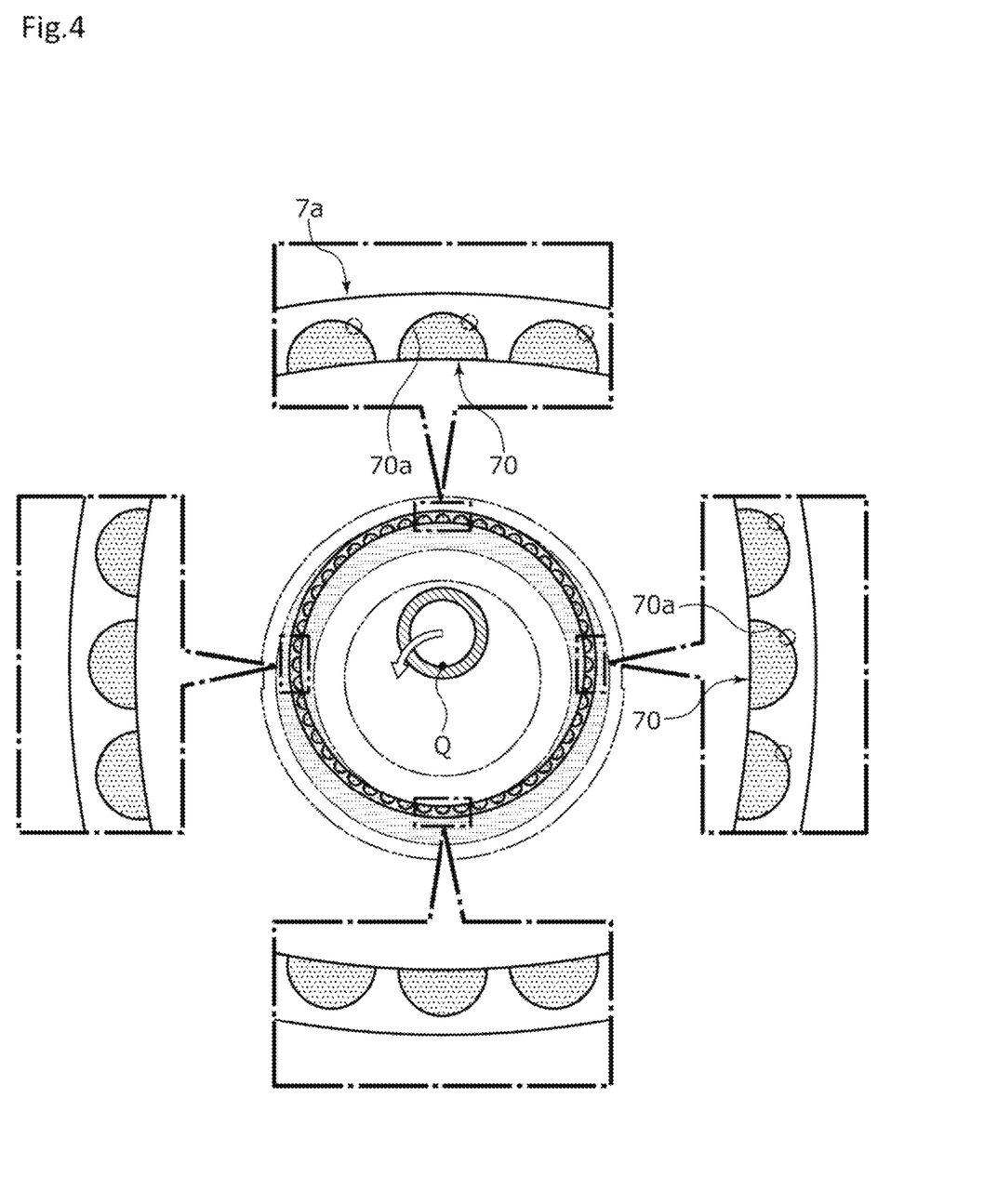
FIG. 4 is a diagram illustrating the distribution of the pressure generated in a plurality of grooves as a result of the relative movement of the groove entailed by the eccentric rotary shaft rotation in the sliding surface of the side seal illustrated in FIG. 3A.

Referring to FIG. 4, when the side seal 7 is to move from the rotational state of FIG. 3A to the rotational state of FIG. 3B as indicated by the white arrow, the fluid moves relative to the white arrow in the opposite direction, and thus the fluid in each groove 70 moves toward the region on the upper right side of the page of the wall surface 70a and dynamic pressure is generated.

Figure 5:
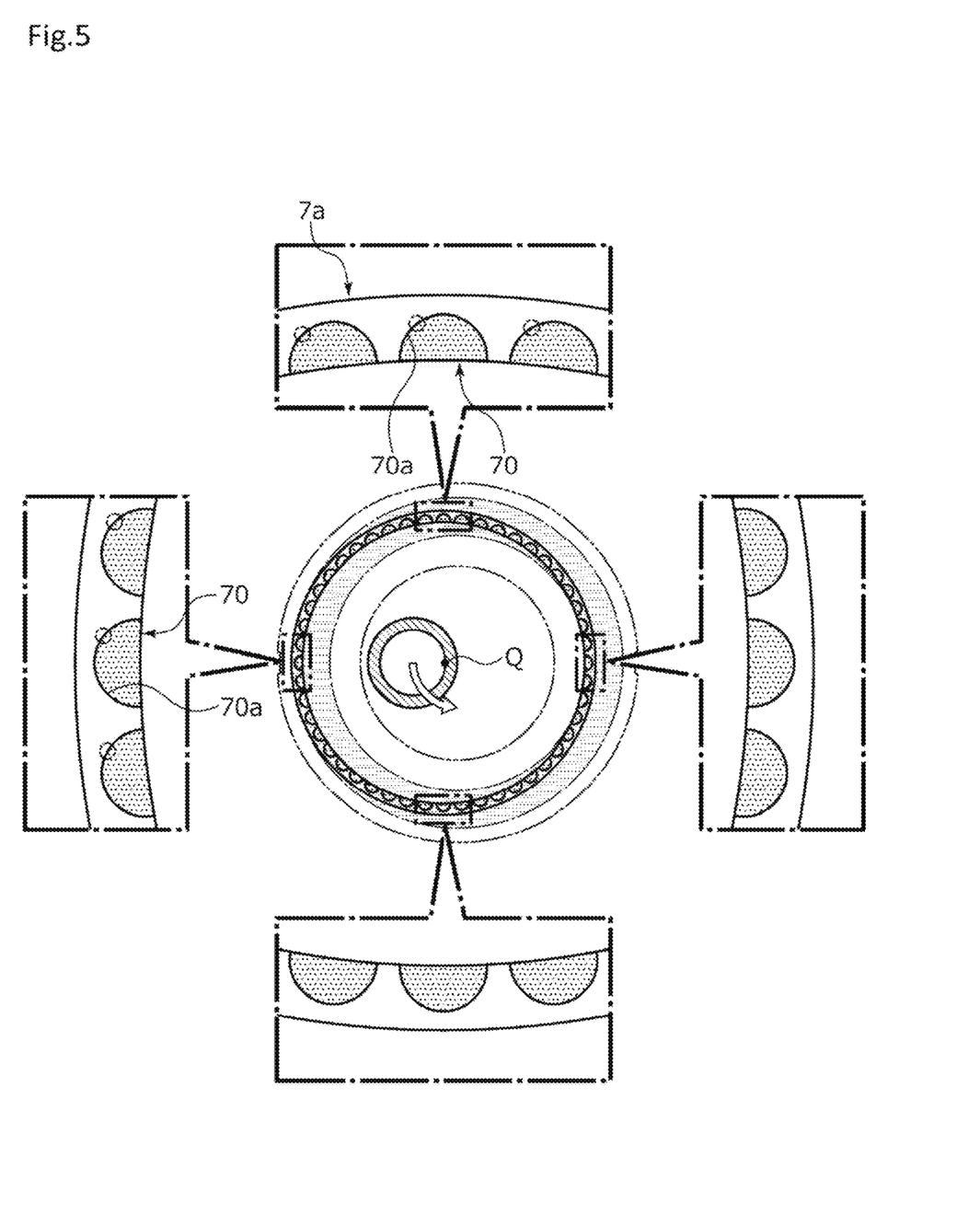
FIG. 5 is a diagram illustrating the distribution of the pressure generated in the plurality of grooves as a result of the relative movement of the groove entailed by the eccentric rotary shaft rotation in the sliding surface of the side seal illustrated in FIG. 3B.

In addition, referring to FIG. 5, when the side seal 7 is to move from the rotational state of FIG. 3B to the rotational state of FIG. 3C as indicated by the white arrow, the fluid moves relative to the white arrow in the opposite direction, and thus the fluid in each groove 70 moves toward the region on the upper left side of the page of the wall surface 70a and dynamic pressure is generated.

Figure 6:
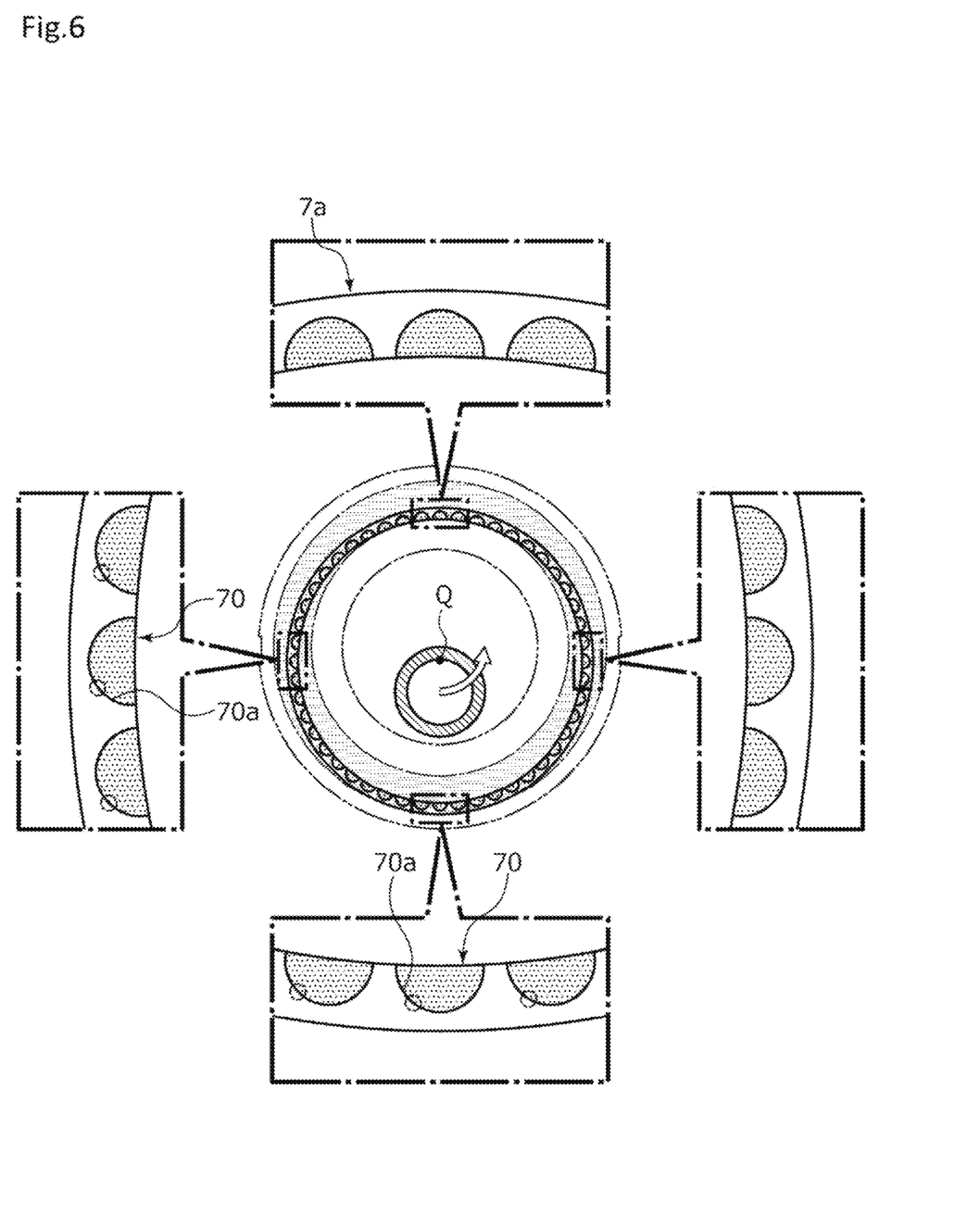
FIG. 6 is a diagram illustrating the distribution of the pressure generated in the plurality of grooves as a result of the relative movement of the groove entailed by the eccentric rotary shaft rotation in the sliding surface of the side seal illustrated in FIG. 3C.

In addition, referring to FIG. 6, when the side seal 7 is to move from the rotational state of FIG. 3C to the rotational state of FIG. 3D as indicated by the white arrow, the fluid moves relative to the white arrow in the opposite direction, and thus the fluid in each groove 70 moves toward the region on the lower left side of the page of the wall surface 70a and dynamic pressure is generated.

Figure 7:
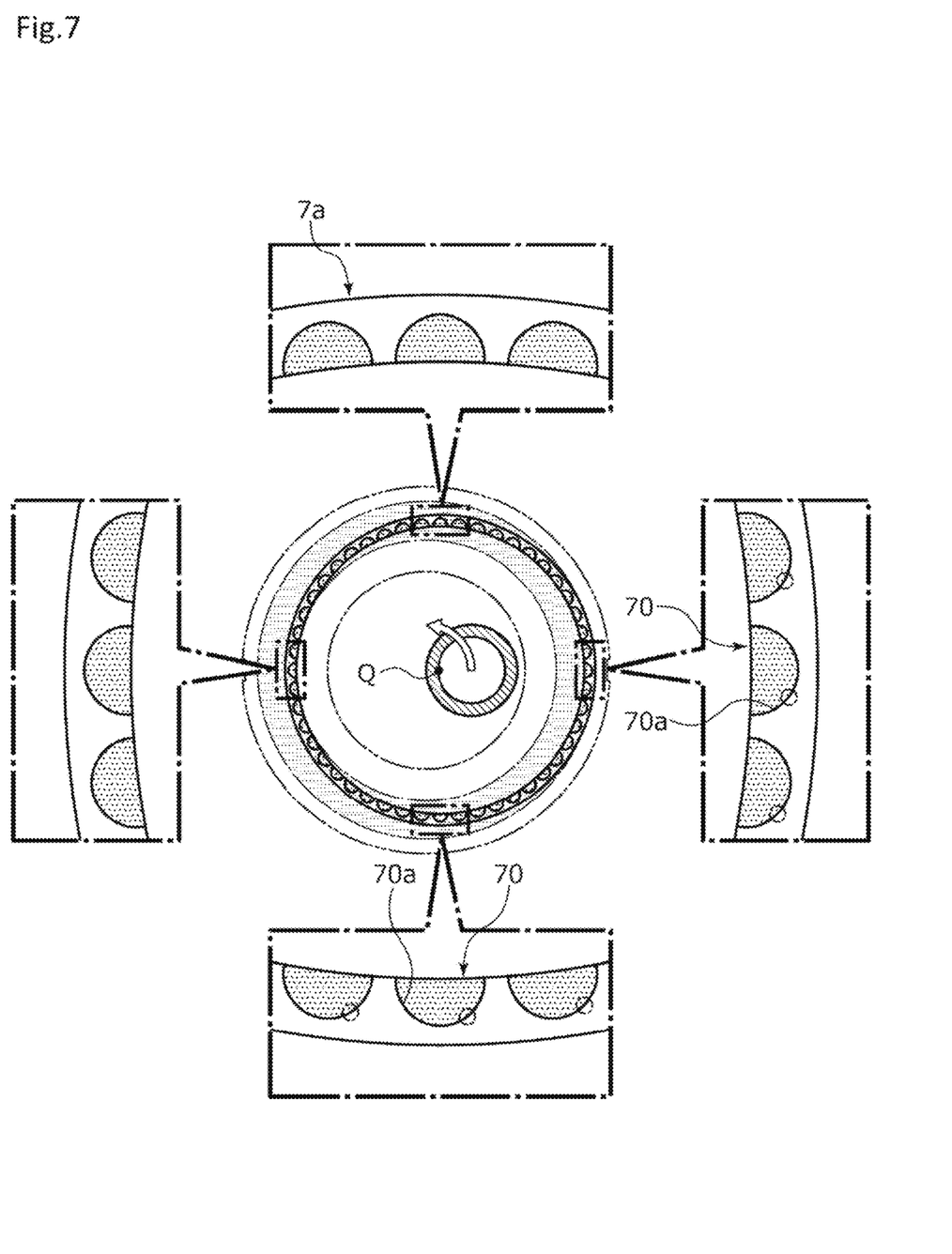
FIG. 7 is a diagram illustrating the distribution of the pressure generated in the plurality of grooves as a result of the relative movement of the groove entailed by the eccentric rotary shaft rotation in the sliding surface of the side seal illustrated in FIG. 3D.

In addition, referring to FIG. 7, when the side seal 7 is to move from the rotational state of FIG. 3D to the rotational state of FIG. 3A as indicated by the white arrow, the fluid moves relative to the white arrow in the opposite direction, and thus the fluid in each groove 70 moves toward the region on the lower right side of the page of the wall surface 70a and dynamic pressure is generated.

As described above, the groove 70 is configured by the continuous wall surface 70a having the same radius of curvature. Accordingly, in each groove 70, the point of the pressure generated on the wall surface 70a in accordance with the rotation angle of the boss 42c gradually moves along the wall surface 70a (see FIGS. 4 to 7).

At this time, regardless of the eccentric rotation angle, that is, the eccentric rotation phase in each groove 70, the number of the grooves 70 where the dynamic pressure is generated is equal and the angle with reference to the center of the circular arc of the groove 70 of the point where the pressure of the grooves 70 where the dynamic pressure is generated is the highest is substantially the same. Accordingly, the points where the dynamic pressure is generated are scattered in the range of approximately 180 degrees in the circumferential direction of the sliding surface 7a of the side seal 7.

According to this, the plurality of grooves 70 open to the back pressure chamber 50 on the inner diameter side where the fluid is present are provided in the circumferential direction in the sliding surface 7a of the side seal 7, the groove 70 is configured by the continuous wall surface 70a having the same radius of curvature, and thus a fluid is capable of flowing in between the sliding surfaces 7a and 8a from the opening of the groove 70 provided in the sliding surface 7a relatively sliding with the eccentric rotation and dynamic pressure can be generated along the wall surface 70a constituting the groove 70 in accordance with the relative movement (see FIG. 3) of the groove 70 entailed by the eccentric rotation. Accordingly, the lubricity between the sliding surfaces 7a and 8a can be improved and the frictional resistance of the sliding surface 7a can be reduced by the sliding surfaces 7a and 8a being slightly separated from each other while the vibration, inclination, or the like of the side seal 7 attributable to dynamic pressure is suppressed and a liquid film attributable to lubricating oil being formed. Accordingly, dynamic pressure can be generated at all times in the groove 70 positioned in the range continuous in the circumferential direction of the sliding surface 7a.

In addition, the plurality of grooves 70 are provided in the circumferential direction of the sliding surface 7a, and thus dynamic pressure can be generated by the plurality of grooves 70 in accordance with the direction of the relative movement of the groove 70 entailed by the eccentric rotation. In addition, the distribution of the pressure generated in the plurality of grooves 70 as a result of the relative movement of the groove 70 entailed by the eccentric rotation of the rotary shaft 2 (see FIGS. 4 to 7) moves in a substantially circumferential direction with the eccentric rotation. Accordingly, the fluid that has flowed between the sliding surfaces 7a and 8a out of the groove 70 upstream in the circumferential direction as a result of dynamic pressure generation easily flows into the adjacent groove 70 downstream in the circumferential direction and a liquid film attributable to lubricating oil is easily formed over the circumferential direction between the sliding surfaces 7a and 8a.

In addition, although the fluid in the groove 70 collides with the wall surface 70a by the groove 70 relatively moving with the eccentric rotation and the fluid flows out between the sliding surfaces 7a and 8a and dynamic pressure is generated as a result, the position where the pressure is highest in each groove 70 changes in accordance with the rotation angle of the boss 42c illustrated in FIG. 3. In other words, although the position where the pressure is highest in each groove 70 differs depending on the rotation angle of the boss 42c, the plurality of grooves 70 are equally arranged in the circumferential direction of the sliding surface 7a, and thus variations in the dynamic pressure that is generated in the circumferential direction between the sliding surfaces 7a and 8a can be suppressed.

In addition, the wall surface 70a of the groove 70 has a continuous shape of the same radius of curvature. According to this, in each groove 70, dynamic pressure is generated in a different aspect and the point of the pressure generated on the wall surface 70a gradually moves along the wall surface 70a in accordance with the rotation angle of the boss 42c. Accordingly, the dynamic pressure generated in the circumferential direction between the sliding surfaces 7a and 8a is unlikely to change sharply and the generated dynamic pressure can be stabilized. It should be noted that the aspect refers to the dynamic pressure generation position in the groove 70 and the generated pressure.

In addition, the groove 70 is formed in a substantially semicircular shape having the center P (see FIG. 2) at the innermost diameter of the sliding surface 7a. According to this, the groove 70 is capable of generating a stable dynamic pressure in any direction of relative movement corresponding to the continuous and substantially semicircular arc-shaped wall surface 70a having the same radius of curvature. Specifically, the groove 70 is formed in a substantially semicircular shape, and thus a stable dynamic pressure can be generated in the direction of relative movement of approximately 180 degrees corresponding to the wall surface 70a.

In addition, the groove 70 is open to the space on the inner diameter side, and thus the fluid that has flowed into the groove 70 from the opening of the groove 70 is easily held in the groove 70 by the centrifugal force. Accordingly, poor lubrication is unlikely to occur between the sliding surfaces 7a and 8a and a liquid film attributable to lubricating oil is formed with ease.

In addition, the groove 70 is open toward the back pressure chamber 50, which is higher in pressure than the low-pressure chamber 20. As a result, a fluid easily flows into the groove 70 from the opening of the groove 70 using the pressure of the fluid. Accordingly, a higher dynamic pressure can be generated in the groove 70.

In addition, the radial width of the side seal 7 where the groove 70 is formed in the sliding surface 7a is smaller than the radial width of the relatively sliding thrust plate 8 (see FIGS. 1 and 3). According to this, between the sliding surfaces 7a and 8a sliding relative to each other with the eccentric rotation, the entire sliding surface 7a of the side seal 7 is always positioned in the sliding region between the sliding surface 7a of the side seal 7 and the sliding surface 8a of the thrust plate 8 (See FIG. 3). As a result, dynamic pressure can be reliably generated by the groove 70.

Although an embodiment of the present invention has been described above with reference to the drawings, the specific configurations are not limited to the embodiment and any changes or additions within the scope of the present invention are included in the present invention.

Although an aspect in which the side seal 7 as a sliding component is applied to the scroll compressor C used in the air conditioning system of an automobile or the like has been described in the above embodiment, the present invention is not limited thereto and the side seal 7 as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

Figure 8:
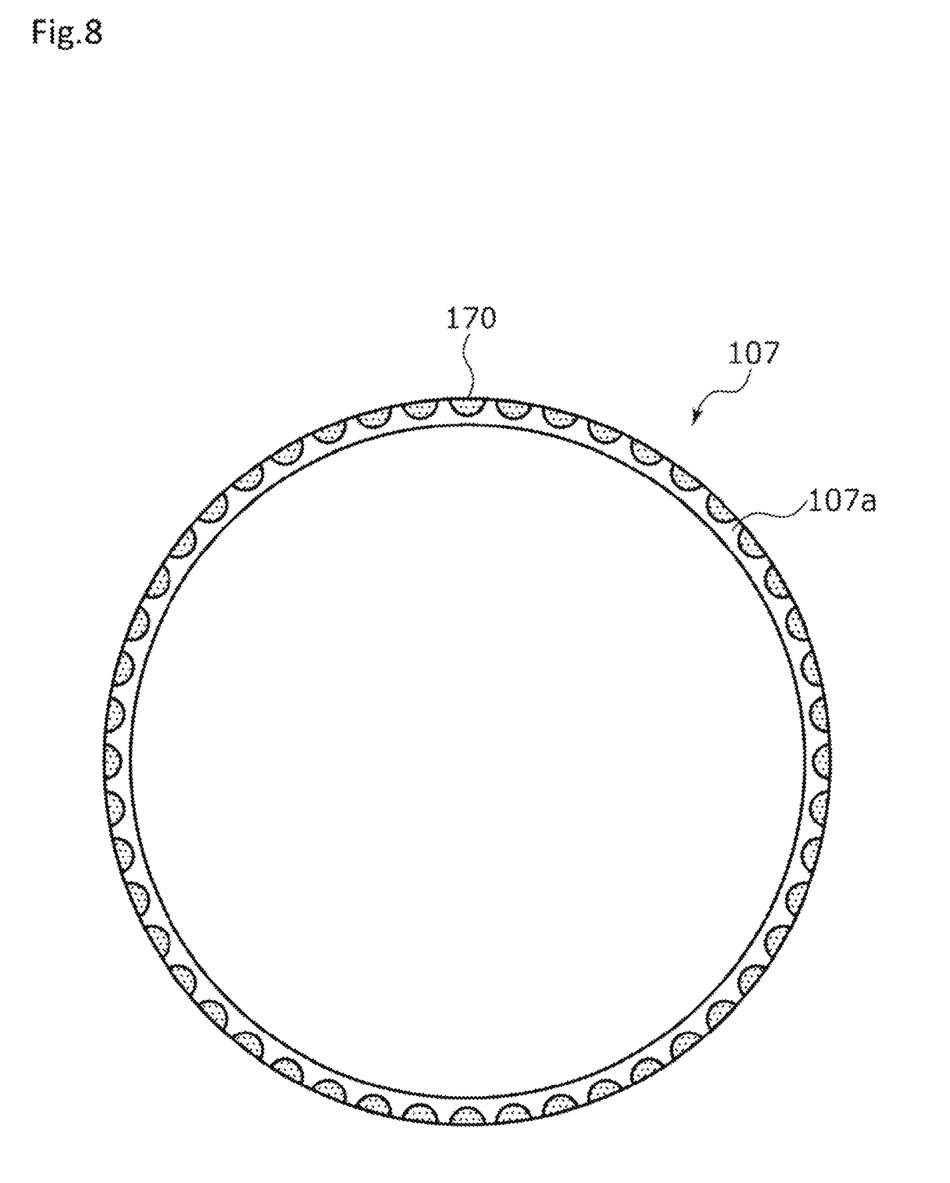
FIG. 8 is a diagram illustrating a first modification example of the groove formed in the sliding surface of the side seal.

In addition, although an aspect in which the groove 70 formed in the sliding surface 7a of the side seal 7 is open to the space on the inner diameter side has been described in the above embodiment, the present invention is not limited thereto. A groove 170 may be formed in a circular shape having its center at the outermost diameter of a sliding surface 107a and may be open to the space on the outer diameter side as in a side seal 107 of a first modification example illustrated in FIG. 8.

Figure 9:
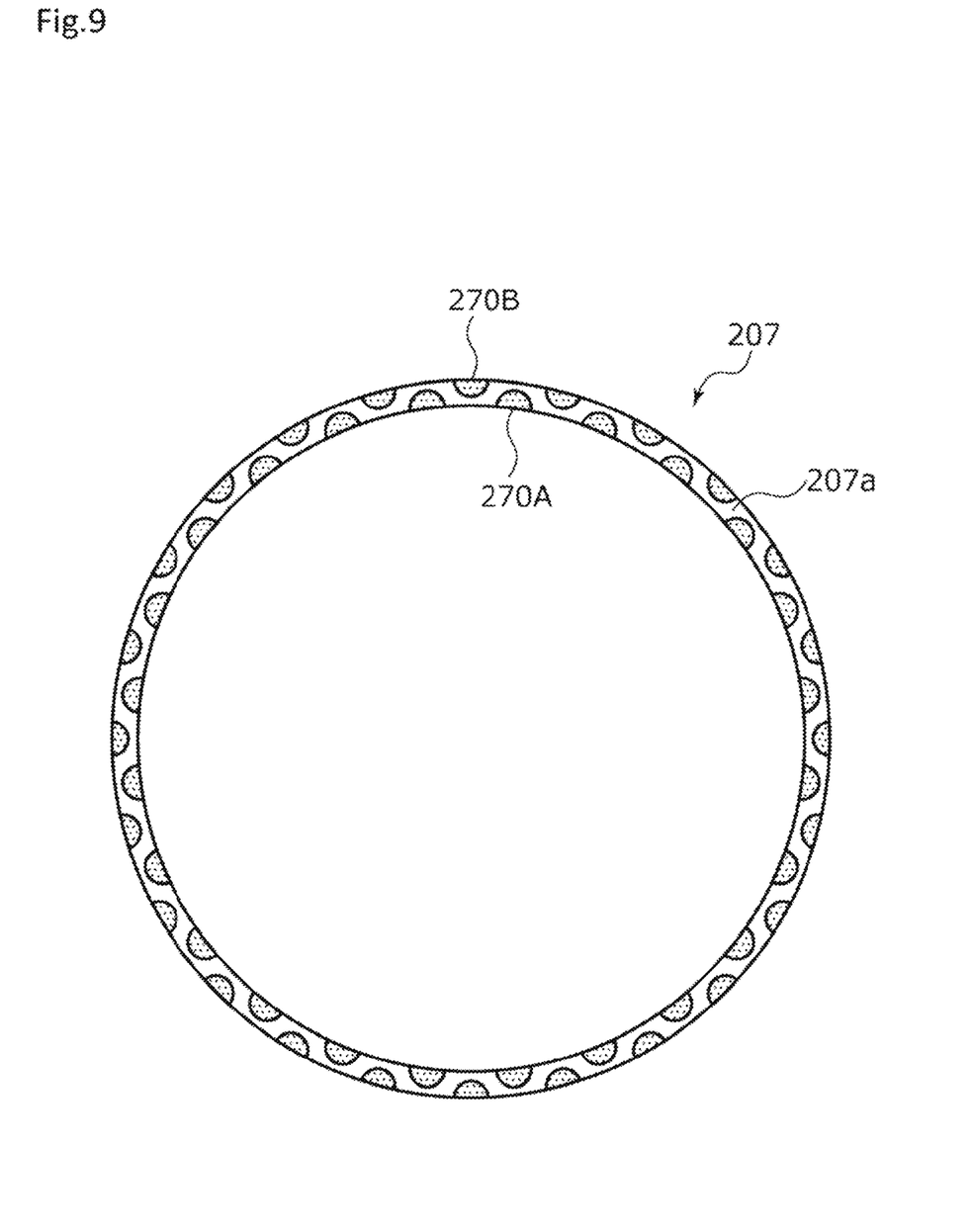
FIG. 9 is a diagram illustrating a second modification example of the groove formed in the sliding surface of the side seal.

In addition, a groove 270A open to the space on the inner diameter side and a groove 270B open to the space on the outer diameter side may be alternately formed in the circumferential direction of a sliding surface 207a as in a side seal 207 of a second modification example illustrated in FIG. 9.

Figure 10A:
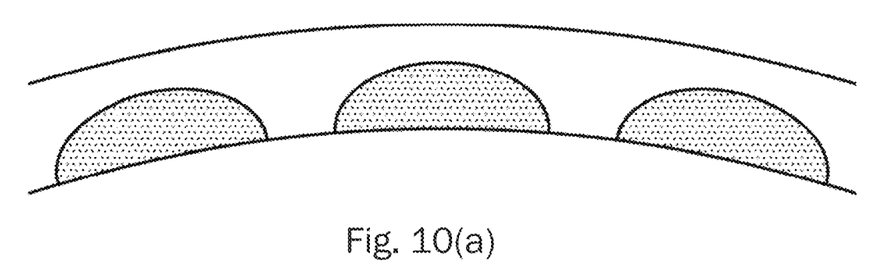
FIG. 10 is a diagram illustrating third to fifth modification examples of the groove formed in the sliding surface of the side seal.

In addition, although the groove 70 is formed in a circular shape having its center at the innermost diameter of the sliding surface 7a and the wall surface 70a is formed in a substantially semicircular arc shape in the above embodiment, the present invention is not limited thereto. The groove may have a wall surface continuous in a circular arc shape. In another example, the groove may be formed in a semi-elliptical shape and the wall surface may have a circular arc shape as in a third modification example illustrated in FIG. 10A.

Figure 10B:
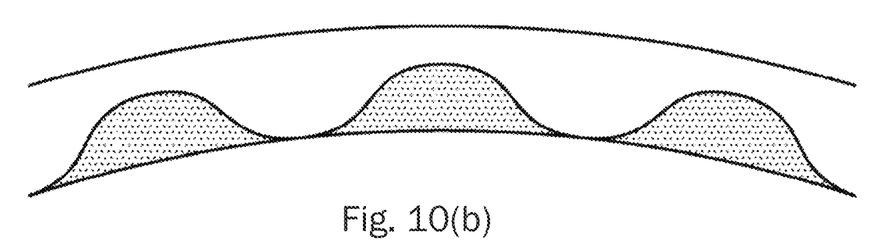

In addition, as in a fourth modification example illustrated in FIG. 10B, the wall surface of the groove may be continuous in a circular arc shape and the groove may be formed in a wavy shape along the inner periphery of the sliding surface.

Figure 10C:
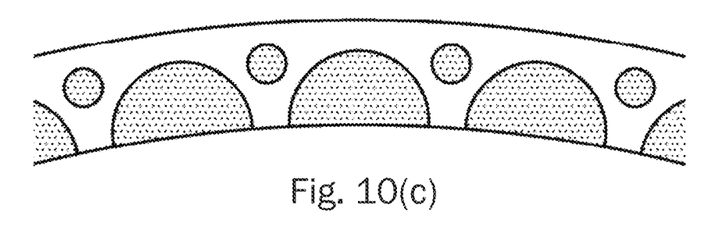

In addition, as in a fifth modification example illustrated in FIG. 10C, a separate groove communicating with neither the inside space nor the outside space may be formed in addition to the groove open to the space on the inner diameter side. It should be noted that the grooves of the third to fifth modification examples may be open to the space on the outer diameter side as in the first modification example or may be alternately open to the spaces on the inner and outer diameter sides as in the second modification example.

In addition, although an aspect in which the groove 70 formed in the sliding surface 7a of the side seal 7 is open toward the back pressure chamber 50 higher in pressure than the low-pressure chamber 20 has been described in the above embodiment, the present invention is not limited thereto and the groove may be open toward the low-pressure chamber 20. In addition, insofar as the sliding component of the present invention has a sliding surface relatively sliding with eccentric rotation, the sliding component of the present invention may be used in an environment in which the pressure inside the sliding surface and the pressure outside the sliding surface are substantially the same without being limited to an environment in which the pressure inside the sliding surface and the pressure outside the sliding surface differ from each other. In addition, the sliding component of the present invention does not have to function as a seal and may be one capable of reducing friction on a sliding surface.

In addition, although the side seal 7 having the relatively sliding surface 7a is made of resin and the thrust plate 8 having the relatively sliding surface 8a is made of metal in the above embodiment, the material of the sliding component may be freely selected in accordance with the environment of use and so on.

In addition, although an aspect in which the groove 70 is formed in the sliding surface 7a of the side seal 7 has been described in the above embodiment, the present invention is not limited thereto. A groove may be formed in the sliding region of the sliding surface 8a of the thrust plate 8 (see FIG. 3), which is a sliding component having a sliding surface relatively sliding with eccentric rotation. In addition, grooves may be formed in both the sliding surface 7a of the side seal 7 and the sliding surface 8a of the thrust plate 8.

In addition, although a configuration in which the sliding surface 7a of the side seal 7 as a sliding component and the sliding surface 8a of the thrust plate 8 as a sliding component slide relative to each other with eccentric rotation has been described in the above embodiment, the present invention is not limited thereto. A groove may be formed in the sliding surface relatively sliding with eccentric rotation with only one of the side seal and the thrust plate provided. For example, in a case where only the thrust plate is provided, grooves may be formed in one or both of the sliding surface of the thrust plate as a sliding component and the back surface of the end plate of the movable scroll. In addition, in a case where only the side seal is provided, a groove may be formed in the sliding surface of the side seal as a sliding component. In this case, the side seal also functions as a thrust bearing that abuts against the inner peripheral surface of the inner casing and receives the axial load of the movable scroll.

In a case where the side seal and the thrust plate are not provided and the back surface of the end plate of the movable scroll functions as a thrust bearing that abuts against the inner peripheral surface of the inner casing and receives the axial load of the movable scroll, a groove may be formed in the sliding surface formed on the back surface of the end plate of the movable scroll.

REFERENCE SIGNS LIST

1 Housing
2 Rotary shaft
2a Eccentric portion
3 Inner casing
4 Scroll compression mechanism
6 Oil separator
7 Side seal (sliding component)
7a Sliding surface
8 Thrust plate
8a Sliding surface
10 Suction port
13 Discharge communication passage
14 Back pressure communication passage
15 Suction communication passage
20 Low-pressure chamber
30 High-pressure chamber
40 Compression chamber
41 Fixed scroll 42 Movable scroll
50 Back pressure chamber
70 Groove
70a Wall surface (Side wall surface)
70b Bottom surface
107 Side seal (sliding component)
107a Sliding surface
170 Groove
207 Side seal (sliding component)
207a Sliding surface
270A Groove
270B Groove
C Scroll compressor
M Drive motor
P Center of groove
Q Center of sliding surface

The invention claimed is:

1. An eccentric sliding assembly in accordance with the present invention comprising:
   a first sliding component formed in an annular shape and having a sliding surface, wherein
   a second sliding component having a sliding surface; and
   an eccentric driving device configured to cause the sliding surface of the first slide component to slide relative to the sliding surface of the second sliding surface such that a center of the first sliding component imaginarily draws a circle which is eccentric with respect to a center of the second sliding component while keeping non-rotation state of the first sliding component with respect to the center of the first sliding component in a plan view,
   the sliding surface of at least one of the first sliding component and the second sliding component is provided with a plurality of grooves each of which is open to a fluid space on at least one of an inner diameter side and an outer diameter side and which are arranged in a circumferential direction, and
   a side wall surface of each of the grooves is configured by a wall surface continuous in a circular arc shape in a plan view.

2. The eccentric sliding assembly according to claim 1, wherein each of the grooves is formed in a semicircular shape having a center at an innermost or outermost diameter of the sliding surface of the one of the first sliding component and the second sliding component in the plan view.

3. The eccentric sliding assembly according to claim 2, wherein each of the grooves is open to the fluid space on the inner diameter side.

4. The eccentric sliding assembly according to claim 2, wherein each of the grooves is open to the fluid space on a high-pressure side.

5. The eccentric sliding assembly according to claim 2, wherein the first sliding component has a radial width smaller than a radial width the second sliding component.

6. The eccentric sliding assembly according to claim 1, wherein each of the grooves is open to the fluid space on the inner diameter side.

7. The eccentric sliding assembly according to claim 6, wherein each of the grooves is open to the fluid space on a high-pressure side.

8. The eccentric sliding assembly according to claim 6, wherein the first sliding component has a radial width smaller than a radial width of the second sliding component.

9. The eccentric sliding assembly according to claim 1, wherein each of the grooves is open to the fluid space on a high-pressure side.

10. The eccentric sliding assembly according to claim 9, wherein the first sliding component has a radial width smaller than a radial width the second sliding component.

11. The eccentric sliding assembly according to claim 1, wherein the first sliding component has a radial width smaller than a radial width of the second sliding component.

12. The eccentric sliding assembly according to claim 1, wherein the grooves including both of the groove which opens to the fluid space on the inner diameter side and the groove which opens to the fluid space on the outer diameter side.

* * * * *